United States Patent [19]

Patnaik

[11] 4,342,856
[45] Aug. 3, 1982

[54] PROPYLENE POLYMERIZATION PROCESS AND PRODUCT

[75] Inventor: Birendra K. Patnaik, Parsippany, N.J.

[73] Assignee: El Paso Polyolefins Company, Paramus, N.J.

[21] Appl. No.: 206,810

[22] Filed: Nov. 14, 1980

[51] Int. Cl.³ .......................... C08F 4/02; C08F 10/06
[52] U.S. Cl. .............................. 526/125; 252/429 B; 526/348; 526/351
[58] Field of Search ........................................ 526/125

[56] References Cited

U.S. PATENT DOCUMENTS

| | | | |
|---|---|---|---|
| 4,186,107 | 1/1980 | Wagner | 526/125 |
| 4,226,741 | 10/1980 | Luciani et al. | 526/125 |
| 4,229,558 | 10/1980 | Kakogawa et al. | 526/125 |

*Primary Examiner*—Edward J. Smith
*Attorney, Agent, or Firm*—Fred S. Valles; Margareta LeMaire

[57] ABSTRACT

Propylene polymers of improved melt flow characteristics are obtained in a liquid pool propylene polymerization process carried out in the presence of a magnesium halide supported titanium halide-aluminum trialkyl catalyst system, where prior to its introduction to the polymerization reactor, the magnesium halide supported titanium halide catalyst component is admixed with an aromatic carboxylic acid ester electron donor and the mixture is subsequently introduced into the poymerization zone no later than about 5 days from the time of admixing.

22 Claims, No Drawings

PROPYLENE POLYMERIZATION PROCESS AND PRODUCT

BACKGROUND OF THE INVENTION

Recently new catalysts have been developed which are far more active than conventional unsupported titanium halide organoaluminum systems catalyst in the polymerization of alpha-lefins. Briefly described, these new catalysts are comprised of a titanium halide catalyst component supported on magnesium dihalide and an alkylaluminum compound, which can be present as a complex with an electron donor compound. These catalyst components have been described in the patent literature, e.g. in U.S. Pat. Nos. 3,830,787; 3,953,414; 4,051,313; 4,115,319 and 4,149,990.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, especially when the polymerization reaction is carried out in a liquid diluent, e.g. liquid propylene monomer ("liquid pool" polymerization).

Using these new magnesium halide supported catalysts the melt flows of the desired propylene polymers can be regulated by carrying out the polymerization in the presence of hydrogen. However, compared to conventional unsupported titanium halide catalysts, a significantly greater amount of hydrogen (e.g. about 2-3 times greater) is needed to obtain products of the same melt flow. This, in turn, results in lowering the weight average molecular weight of the polymer product and, thus, also detrimentally affects many of the physical properties of the polymer such as tensile strength, impact strength, etc.

It is, therefore, a principal object of the present invention to provide a process for the production of propylene polymers of improved melt flow characteristics without detrimentally affecting the quality of the polymer.

Other objects will become apparent from a reading of the specification and appended claims.

THE INVENTION

The above objects are accomplished by the addition of a pretreatment step to a process wherein propylene is polymerized in a polymerization zone at pressures sufficient to maintain propylene in liquid phase and at temperatures between about 115° F. and about 165° F. in the presence of a catalyst composition containing the components
 (a) an aluminum trialkyl at least partially complexed with an aromatic carboxylic acid ester electron donor and
 (b) a complex of a titanium tri- or tetrahalide with an aromatic carboxylic acid ester electron donor supported on magnesium halide
the components (a) and (b) being provided in a molar ratio of Al/Ti between about 10 and about 400. The improvement comprises admixing component (b) prior to its introduction into the polymerization zone with an aromatic carboxylic acid ester electron donor in a mole ratio of carboxylic acid ester to titanium of from about 2:1 to about 30:1, and introducing said mixture to the reaction zone no later than about 5 days from the time of admixing. Preferably the ageing time of the mixture is between 0 and 2 days, the shorter times being most preferable.

It has previously been found that an increase in the amount of electron donor fed to the polymerization system at otherwise constant operating conditions (equal to a decrease an Al/electron donor mole ratio) causes a corresponding decrease in melt flow characteristics of the polymer product. It was, therefore, completely unexpected to find that when the titanium halide catalyst component is pretreated with a portion of the total amount of electron donor used in the process, the melt flow is significantly improved and that, contrary to the results of no pretreatment, a decrease in the Al/electron donor mole ratio causes a beneficial increase in the melt flow. It was also found that the weight average molecular weight of the product from the process of this innovation was significantly higher which in turn would result in better physical properties of the polymer.

DETAILED DESCRIPTION OF THE INVENTION

The process can be carried out in batch wise, semi-continuous or continuous fashion. The polymer is formed in the reactor employing liquid propylene as diluent and a catalyst for the polymerization carrying out the polymerization to a polymer solids content of from 5 to 60%, but preferably 10 to 40%. The propylene functions as the liquid diluent as well as feed to the reaction, except for small quantities of inert hydrocarbons, e.g. hexane, mineral oil, petrolatum, etc., that may be used for the introduction of the catalyst components into the reaction zone.

One or more other alpha-olefins of from 2 to 10 carbon atoms can be used in admixture with the propylene to form the polymer. Such other alpha-olefins include ethylene, butene-1, isobutene-1, pentene-1, hexene-1, and higher, as well as branched alpha-olefins such as 2-methyl butene-1, 4-methyl pentene-1 and higher. Generally, the concentration in the total monomer feed of these comonomers is maintained between about 0.1 and about 20 mole percent.

Temperatures at which the polymer formation can be carried out are those known in the art, for example, from 50° to 250° F., preferably from 115° to 165° F. and most preferably from 125° F. to about 155° F. The pressures used in the reaction can range up to about 500 psig and even higher.

The catalyst used in the process is a two-component composition which can be any one of the recently developed, high activity magnesium halide supported catalyst components and organoaluminum cocatalyst components disclosed e.g. in U.S. Pat. Nos. 3,830,787; 3,953,414; 4,051,313; 4,115,319 and 4,149,990, hereby incorporated in this application by reference. The components are introduced separately into the polymerization reactor. Component (a) of the catalyst composition is advantageously selected from trialkyl aluminum containing from 1 to 8 carbon atoms in the alkyl group, such as triethyl aluminum, trimethyl aluminum, tri-n-butyl aluminum, tri-isobutyl aluminum, triisohexyl aluminum, tri-n-octyl aluminum and tri-isooctyl aluminum.

The trialkyl aluminum is at least complexed with an electron donor prior to introduction into the polymerization reactor. Best results are achieved when esters of aromatic acids, are used as the electron donors.

Some typical examples of such compounds are methyl-and ethylbenzoate, methyl- and ethyl-p-methoxybenzoate, ethyl-o-chlorobenzoate, ethylnaphthenate, methyl-p-toluate, ethylanisate, and the like. The molar ratio of aluminum alkyl to electron donor can range between 1 and 100, preferably between 2 and 5. Solutions of the electron donor and the trialkyl aluminum compound in a hydrocarbon such as hexane or heptane are preferably prereacted for a certain period of time generally less than 1 hour prior to feeding the mixture into the polymerization reaction zone.

The other component of the catalyst composition is a complex of a titanium tri- or tetrahalide with an electron donor compound supported on magnesium dihalide. The halogen in the respective halides can be chlorine, bromine or iodine, the preferred halogen being chlorine. The electron donor is suitably selected from the esters of aromatic carboxylic acids, such as benzoic acid, p-methoxybenzoic acid and p-toluic acids and particularly the alkyl esters of said acid. The magnesium to electron donor molar ratio are equal to or higher than 1 and preferably between 2 and 10. Generally, the titanium content expressed as titanium metal ranges between 0.1 and 20 wt % in the supported catalyst component and preferably between 1 and 3 wt %.

The preparation of such supported catalyst components has been described in the prior art and are commercially available.

The pretreatment step of this invention is preferably carried out by mixing a slurry of the magnesium halide-supported titanium halide component in a heavy mineral oil e.g. paraffin oil or petrolatum, with a solution of the electron donor in a normally liquid hydrocarbon which is inert in the polymerization. Examples of such hydrocarbons are hexane, heptane, paraffin oil, etc. The mole ratio of the electron donor to titanium should be maintained in the range from about 2:1 to about 30:1 and preferably from about 2:1 to about 10:1 to minimize losses in production rates.

The resulting slurry preferably should have a solids content from about 4 to about 65 weight percent to assure its problem-free introduction, e.g., by a pump, into the reactor. The time from the admixing to the introduction into the polymerization reaction should be kept as low as practically possible. Preferably, the ageing time should be no more than about 5 days and preferably 2 days or less to minimize any reduction in productivity rate of the catalyst composition.

The catalyst components, i.e., the organoaluminum component (a) and the pretreated titanium halide component (b) are fed to the polymer reaction zone in amounts such that the Al/Ti molar ratio is maintained preferably between about 10 and 400. The monomer feed to Ti metal weight ratio is usually in the range of 500,000 and 1,500,000.

Hydrogen is advantageously also added to the polymerization zone to aid in increasing the melt flow. Usually the hydrogen concentration in the monomer is maintained between about 0.1 and about 1.0 mole percent and preferably below about 0.75.

In commercial use the process of this invention is preferably carried out in continuous fashion, i.e., monomer feed and catalyst components are continuously fed to the reactor while a slurry of polymer product in liquid propylene is withdrawn continuously or "pseudo" -continuously. This slurry is separated into polymer product and unreacted monomer, which is advantageously returned to the reaction system. Alternatively, the recovery polymer, still containing active catalyst may be further reacted in a subsequent polymerization zone with additional monomers to produce a block copolymer product.

Because of the generally high productivity of the supported catalyst system expressed in terms of pounds of polymer produced per pound of titanium metal, there is no need to remove catalyst residues from the polymer in a deashing step as is the case with conventional catalyst.

Various additives can, if desired, be incorporated into the polypropylene resin, such as fibers, fillers, antioxidants, metal deactivating agents, heat and light stabilizer, dyes, pigments, lubricants and the like.

The polymers can be used with advantage in the manufacture of fibers, filaments and films by extrusion, of rigid articles by injection molding, and of bottles by blow molding techniques.

The following examples further illustrate the advantages obtained by the invention.

EXAMPLES 1 THROUGH 8

Each of the experiments were carried out using the following procedure.

TABLE I

| Exp. | Ti/MPT in Cat. Slurry (mole) | Ageing Time Days | Final TEAL/MPT ratio (mole) | Productivity Kg/g Ti | II[1] % | MF g/10 min | M × 10$^{-3}$ W |
|---|---|---|---|---|---|---|---|
| 1(control) | 1/0 | 0 | 3.0 | 371 | 92.6 | 5.4 | 303 |
| 2(control) | 1/0 | 0 | 2.5 | 343 | 94.0 | 3.8 | — |
| 3 | ½ | 0 | 2.94 | 341 | 91.6 | 10.8 | 266 |
| 4 | ½ | 4 | 2.94 | 329 | 89.7 | — | — |
| 5 | 1/5 | 5 | 2.86 | 253 | 91.7 | 7.0 | — |
| 6 | 1/10 | 0 | 2.73 | 247 | 91.6 | 11.2 | 257 |
| 7 | 1/10 | 1 | 2.73 | 259 | 91.6 | 12.5 | — |
| 8 | 1/30 | 1 | 2.31 | 135 | 90.9 | 15.2 | 254 |

[1]Isotacticity Index

Into a one liter jacketed and magnetically stirred autoclave maintained at 25° C. and under a propylene purge, was introduced a premixed (7 minute contact time) heptane solution of 2.0 mmole triethylaluminum (TEAL) and 0.67 mmole methyl p-toluate (MPT) followed by 20 mg of a magnesium chloride-supported titanium chloride catalyst. The titanium catalyst was a commercially available catalyst containing about 1.5 wt % titanium, 20.3 wt % magnesium, 60.0 wt % chlorine and 9.6 wt % hydrocarbon volatiles. Ethylbenzoate had been used in the manufacture of the supported titanium chloride catalyst component. The catalyst was introduced as a slurry in mineral oil and was either untreated or treated with MPT as described below. The autoclave was pressurized to 25 psi hydrogen. Propylene (600 ml)

was charged and the reactor contents were brought to 65° C. After 1 hour polymerization, the product was recovered and characterized. Results are summarized in Table I.

The method used in treating the catalyst with MPT involved adding a heptane solution of MPT (60 g/l) onto a mineral oil (Primol 355) slurry of catalyst (40 g/l) at ambient temperature (22° C.) to provide the desired mole ratio of Ti/MPT and ageing the resulting slurry for the time indicated in Table I.

As shown in Table I, with untreated titanium chloride catalyst a decrease in the TEAL/MPT mole ratio from 3.0 to 2.5 caused a drop in melt flow rate from 5.4 to 3.8. However, pretreatment of the titanium chloride catalyst compound with MPT, thereby lowering the TEAL/total MPT mole ratio, unexpectedly caused a corresponding increase in the melt flow rate.

Although the pretreatment in accordance with the invention causes the weight average molecular weight to be lowered to some degree, this decrease is much smaller than would be obtained by using hydrogen alone to produce the same melt flow material. For instance, a 15 melt flow product obtained by using hydrogen as the sole modifier had a weight average molecular weight of only 234 as compared to the value of 254 of the product of Example 8.

EXAMPLES 9 AND 10

The advantage of the invention in the production of copolymers of propylene with other alpha-olefins is further demonstrated by these examples. The test conditions were generally the same as those in the preceding examples except that 25 psi of ethylene was also added subsequent to the propylene addition, the polymerization temperature was 55° C. and the MPT treated catalyst of Example 10 was not aged. The data are shown in Table II.

Similar improvements in melt flow characteristics by pre-treatment of the magnesium chloride-supported titanium chloride catalyst component in accordance with the present invention have also been obtained with other copolymers, e.g., copolymers of propylene and butene-1 and terpolymers of propylene, ethylene and butene-1.

It is obvious to those skilled in the art that many variations and modifications can be made to the process and the polymer of this invention. All such departures from the foregoing specification and considered within the scope of this invention as defined by the specification and the appended claims.

TABLE II

| Ex. No. | Ti/MPT in Cat. Slurry (Mole) | $C_2^=$ psi | $H_2$ psi | Productivity kg/g Ti | II % | Ethylene (Random) wt. % | MF g/10 min |
|---|---|---|---|---|---|---|---|
| 9(Control) | 1/0 | 25 | 25 | 393 | 86.1 | 2.3 | 3.3 |
| 10 | 1/5 | 25 | 25 | 405 | 80.5 | 3.3 | 8.9 |

What is claimed is:

1. In a process for the production of a propylene polymer wherein propylene is polymerized in the presence of hydrogen as polymer melt flow modifier in a polymerization zone at pressures sufficient to maintain propylene in liquid phase and at temperatures between about 115° F. and about 165° F. in the presence of a catalyst composition containing the components (a) an aluminum trialkyl at least partially complexed with an aromatic carboxylic acid ester electron donor and
    (b) a solid complex of a titanium tri- or tetrahalide with an aromatic carboxylic acid ester electron donor supported on magnesium halide,
    the components (a) and (b) being provided in a molar ratio of Al/Ti between about 10 and about 400,
    the method of improving the melt flow of the polymer at reduced hydrogen concentration, which method comprises:
    prior to its introduction into the polymerization zone admixing the complex of component (b) with an aromatic carboxylic acid ester electron donor in a mole ratio of carboxylic acid ester to titanium of from about 2:1 to about 30:1; and introducing said mixture directly to the reaction zone no later than about 5 days from the time of admixing.

2. The process of claim 1 where said mole ratio of aromatic carboxylic acid ester to titanium is between about 2:1 and about 10:1.

3. The process of claim 1, wherein said mixture is introduced to the reaction zone at a time which is from about 0 to about 2 days from the time of the admixing.

4. The process of claim 1, wherein the admixing is carried out by contacting a slurry of component (b) in a heavy mineral oil with a solution of the electron donor in an inert liquid hydrocarbon to form a mixture having a solids content of from about 4 to about 65 weight percent.

5. The process of claim 1, wherein the electron donor used in the admixing is methyl-p-toluate.

6. A process according to claim 1, wherein the polymerization temperature is between about 125° and about 155° F.

7. A process according to claim 1, wherein a homopolymer of propylene is produced.

8. A process according to claim 1, wherein a copolymer of propylene is produced by polymerization of propylene and at least one other alpha-olefin having from 2 to 10 carbon atoms.

9. A process according to claim 8, wherein said other alpha-olefin is selected from ethylene, butene-1 or mixtures thereof.

10. A process according to claim 1, wherein the aluminum trialkyl of component (a) is one containing from 1 to 8 carbon atoms in the alkyl groups.

11. A process according to claim 1, wherein the aluminum trialkyl of component (a) is triethyl aluminum.

12. A process according to claim 1, wherein the ester of component (a) is methyl-p-toluate.

13. A process according to claim 1, wherein the molar ratio of trialkyl aluminum to electron donor in component (a) ranges between about 1 and about 100.

14. A process according to claim 13, wherein the molar ratio is between about 2 and about 5.

15. The process of claim 1, wherein component (a) is prepared by prereacting the aluminum trialkyl with the electron donor for less than one hour prior to polymerization.

16. The process of claim 1, wherein the titanium tri- or tetra-halide is a titanium trichloride or titanium tetrachloride.

17. The process of claim 1, wherein the magnesium dihalide is magnesium dichloride.

18. The process of claim 1, wherein the electron donor of component (b) is ethyl benzoate.

19. The process of claim 1, wherein the magnesium to electron donor molar ratio of component (b) is at least about 1.

20. The process of claim 19, wherein said molar ratio is between about 2 and about 10.

21. The process of claim 1, wherein the titanium content expressed as titanium metal ranges between about 0.1 and about 20 weight percent in the supported catalyst component (b).

22. The process of claim 21, wherein the titanium content is between about 1 and about 3 weight percent.

* * * * *